No. 871,210. PATENTED NOV. 19, 1907.
R. A. CUMMINGS.
CONNECTING AND SPACING CLIP.
APPLICATION FILED JULY 25, 1906.

WITNESSES.
Arthur Loley
J. R. Keller

INVENTOR.
Robert A. Cummings
By Kay, Totten Winter
His Attys.

UNITED STATES PATENT OFFICE.

ROBERT A. CUMMINGS, OF BEAVER, PENNSYLVANIA.

CONNECTING AND SPACING CLIP.

No. 871,210.   Specification of Letters Patent.   Patented Nov. 19, 1907.

Application filed July 25, 1906. Serial No. 327,719.

*To all whom it may concern:*

Be it known that I, ROBERT A. CUMMINGS, a resident of Beaver, in the county of Beaver and State of Pennsylvania, have invented a new and useful Improvement in Connecting and Spacing Clips; and I do hereby declare the following to be a full, clear, and exact description thereof.

This invention relates to a connecting and spacing clip for the metal reinforcement of concrete or cement work and similar structures, or for heavy metal fences and the like.

The object of the invention is to provide a device for this purpose which is simple and cheap to manufacture, which can be applied in the field with a minimum amount of labor, which will hold the parts firmly in position, and which is capable of adjustment so as to enable the position of the connected members to be readily changed.

It is well known that concrete work is to a large extent reinforced by metal rods extending therethrough, and for wall, floor and ceiling constructions especially, it is the practice to have rods running in both directions and crossing each other. My device is adapted especially for connecting and holding such crossing rods and in a manner to permit their adjustment in case they should not be accurately positioned. The device is so constructed that it holds the metal rods rigidly and accurately in position and at the same time space the same from the centering or casing so as to insure the proper position of the reinforcement in the body of the concrete as well as to insure the covering of the outer face of the reinforcement.

The invention consists of a device of the character hereinafter described and claimed.

Figure 1:
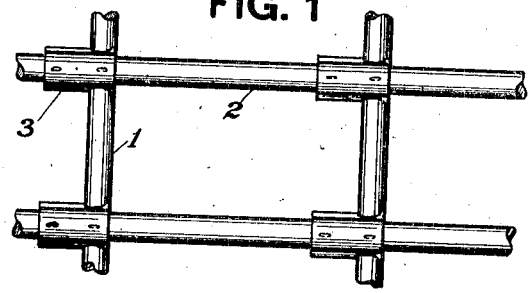
Figure 2:
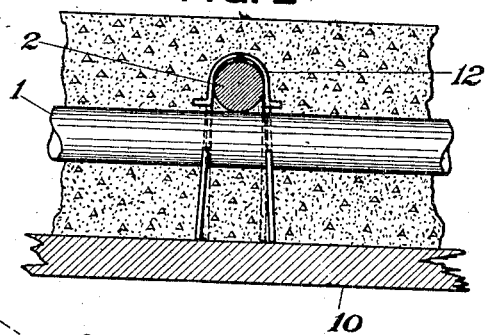
Figure 5:
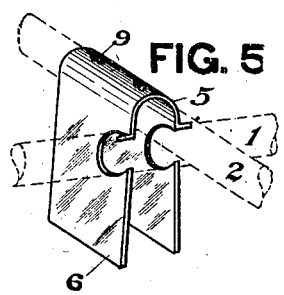
Figure 4:
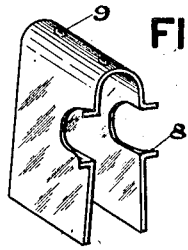
Figure 3:
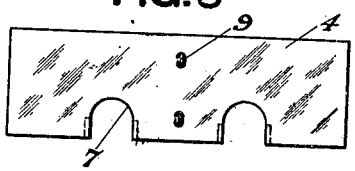

In the accompanying drawings Figure 1 is a plan view of a section of metal reinforcement for a floor, to which my invention is applied; Fig. 2 is a section through same showing the connecting member in side view; Fig. 3 is plan view of a plate showing the same after the first step in the manufacture of the clip; Fig. 4 is a perspective view of the connecting clip as it leaves the factory; and Fig. 5 is a similar view showing one of the tongues bent up after application.

In the drawings my device has been shown applied for connecting crossing rods in concrete floor or ceiling construction, although it is obvious that the device may be used for connecting crossing rods for any structural purpose whatsoever.

In the drawings the rods are shown as crossing each other at right angles, the one set of rods being indicated by the reference numeral 1, and the other by the reference numeral 2. 3 indicates my connecting clip in its preferred form. This clip is made from a strip or band 4 of sheet metal, the same being first punched to the form shown in Fig. 3, and then bent substantially to U-form, so as to provide a loop portion 5, which embraces one of the metal rods, for instance, the rod 1, while the two limbs 6 of the clip are provided at one edge with notches or holes 7, which open on one edge of the limbs so as to receive and embrace the crossing rod 2.

The notches or openings 7 may be of any desired shape, so as to embrace a rod of any desired cross section. Preferably such notches or openings are provided on the outer edges of the limbs with tongues 8, which prevent the rod 2 from escaping sidewise, although they are not absolutely necessary. When round rods are used, the holes 7 preferably are circular, as shown, and cut such a distance from the edges of the limbs as to leave the projecting portion or points 8 which serve as tongues to prevent the escape of the rods 2.

At the factory the clips are first punched as shown in Fig. 3, and are then bent to the shape shown in Fig. 4, with the tongues or points 8 bent outwardly so as to permit the ready entrance of the rod 2 into the openings or notches 5. After assembling the rods and clips these tongues, or at least those on one side of the rod 2, are bent up by means of a pincer or other tool to the position shown in Fig. 5, thus holding the rod 2 in position.

The clips shown are formed preferably of spring or resilient metal and so that the limbs have a tendency to spring outwardly as indicated in Fig. 2, thus causing the edges of the notches 7 to bite the rod 2. This outward movement of the ends of the limbs also causes the rod 2 to be pressed firmly against the rod 10 and the latter against the loop 5. In order to increase the gripping effect on the rod 1 the loop portion 5 of the device is preferably provided with one or more inwardly projecting protuberances or teats 9, which in effect form teeth which bite into the metal of the rod. The two rods are therefore clamped between the teats 9 and the edges of the notches 7, which hold said rods tightly and prevent displacement thereof. In order to release the grip on the rod 2 it is merely necessary to press the ends of the limbs together, as shown in dotted lines Fig. 2, thus releasing the bite of the edges of the holes 7 on the rod 2.

The ends of the limbs of the clip preferably are extended outwardly a sufficient distance to act as spacing members to contact with the casing or centering 10 or at least one of said limbs will be so extended, although preferably both are extended. Consequently a body of concrete is sure to be provided between the reinforcement and the centering or casing. At the same time, the reinforcement is accurately positioned in the body of concrete so as to develop its maximum efficiency.

The clip is applied to the reinforcement by passing it over the rod 1, and then moving it sidewise so as to cause the notches or openings 7 to pass over the rod 2, after which the tongues 6 may be bent up so as to confine said rod 2. The form of the clip will preferably be such as shown in Fig. 1 to 5, being essentially U-shaped, with the two limbs slightly flaring outwardly. This shape, however, can be varied to a considerable extent.

The device described is very simple of construction, as it can be made from band metal by an ordinary punching and bending operation. It very firmly grips the several rods and binds them tightly together, but at the same time the construction is such that it can be readily released so as to shift the relative positions of the rods.

While I have shown the device applied for connecting crossing rods in metal reinforcement for concrete work, it will be understood that it can be used to connect crossing metallic members in any structure whatsoever. It will also be understood that the crossing metal members need not be circular rods, as shown, but may be of any desired cross sectional shape, such as various forms of bars or even strips or bands. By the terms "rod" or "rods" as found in the claims, I intend to cover crossing metallic members of any cross sectional shape. The clips may, if desired, be used with such short limbs as to act as spacing members.

What I claim is:

1. A connector for crossing metal members, comprising a clip provided with a loop and two limbs projecting therefrom, said loop being arranged to embrace one of the crossing members and said limbs being provided in their side edges with openings arranged to engage and retain the other crossing member.

2. A connector for crossing metal members, comprising a metal clip provided with a loop to embrace one of the crossing members and having two limbs provided with edge notches to receive the other crossing member, and tongues at the edges of said notches to retain said member.

3. A connector for crossing metal members, comprising a clip formed of resilient material bent to provide a loop to embrace one of the crossing members and having limbs provided with notches or openings in their edges at right angles to the central loop for engaging and retaining the other crossing member.

4. A connector for crossing metal members, comprising a metal clip having a central portion for engaging one of the crossing members and two divergent resilient limbs provided with openings at right angles to the central portion for receiving and retaining the other crossing member.

5. A connector for crossing metal members, comprising a flat metal clip having a central portion for engaging one of the crossing members and having divergent resilient limbs provided with openings or notches in their edges at right angles to the central portion for receiving and retaining the other crossing member.

6. A connector for crossing metal members, comprising a resilient metal plate bent to substantially U form to provide a central loop for embracing one of the crossing members and having in its limbs alining holes or notches opening on the side edges thereof and arranged to receive and retain the other crossing member.

7. A connector for crossing metal members, comprising a metal plate or strip bent to provide a loop to embrace one of the crossing members and having circular holes cut in its limbs in position to open at the edges of the limbs and leave projecting tongues or points at such edges.

8. A connector and spacing member for metal reinforcement for concrete work, having a loop portion for engaging one of the reinforcement members and two limbs provided in their side edges with openings for engaging another reinforcement member, at least one of said limbs being extended to contact with the centering or casing.

9. A connector and spacing member for metal reinforcement for concrete work, having a loop portion for engaging one reinforcement member, and two limbs provided with openings in their side edges for engaging another reinforcement member, at least one of said limbs being extended to contact with the centering or casing.

10. A connector and spacing member for metal reinforcement for concrete work, comprising a flat metal plate bent to provide a loop for embracing one reinforcement member and having two limbs provided with edge openings for engaging another reinforcement member and with tongues at the edges of the openings to prevent the escape of the reinforcement member, at least one of the limbs being extended to contact with the centering or casing.

11. A connector and spacing member for metal reinforcement of concrete work, comprising a sheet metal resilient plate bent to provide a loop to engage one reinforcement member and having limbs with holes cut therein in alinement and sufficiently spaced from the edge to leave tongues or projections at said edge, one at least of the limbs being extended to contact with the centering or casing.

In testimony whereof, I the said ROBERT A. CUMMINGS have hereunto set my hand.

ROBERT A. CUMMINGS.

Witnesses:
F. W. WINTER,
J. R. KELLER.